United States Patent [19]

Sundstrom

[11] 3,854,364

[45] Dec. 17, 1974

[54] SAW BLADE

[75] Inventor: Erik Wilhelm Sundstrom, Sandviken, Sweden

[73] Assignee: Sandvik Aktiebolag, Sandviken, Sweden

[22] Filed: Nov. 23, 1973

[21] Appl. No.: 418,220

[30] Foreign Application Priority Data
Nov. 23, 1973  Sweden............................ 16984/73

[52] U.S. Cl...................... 83/835, 83/676, 144/218, 144/240
[51] Int. Cl........................ B27b 33/08, B23d 61/02
[58] Field of Search ............. 83/835, 855, 663, 676; 144/218, 240; 29/95 B; 76/101 A, 112

[56] References Cited

UNITED STATES PATENTS

| 214,389 | 4/1879 | Hill ...................................... 83/835 |
| 2,563,559 | 8/1951 | Sneva.................................... 83/835 |
| 3,799,025 | 3/1974 | Tsunoda .............................. 83/835 |
| 3,812,755 | 5/1974 | Danielsen ............................ 83/835 |

Primary Examiner—Frank T. Yost
Attorney, Agent, or Firm—Pierce, Scheffler & Parker

[57] ABSTRACT

For suppressing vibrational noise from a circular metal saw blade, the base plate of the saw is provided with a concentrically disposed covering plate. The covering plate has an annular indentation that is received in a complementary recess formed in the base plate.

6 Claims, 5 Drawing Figures

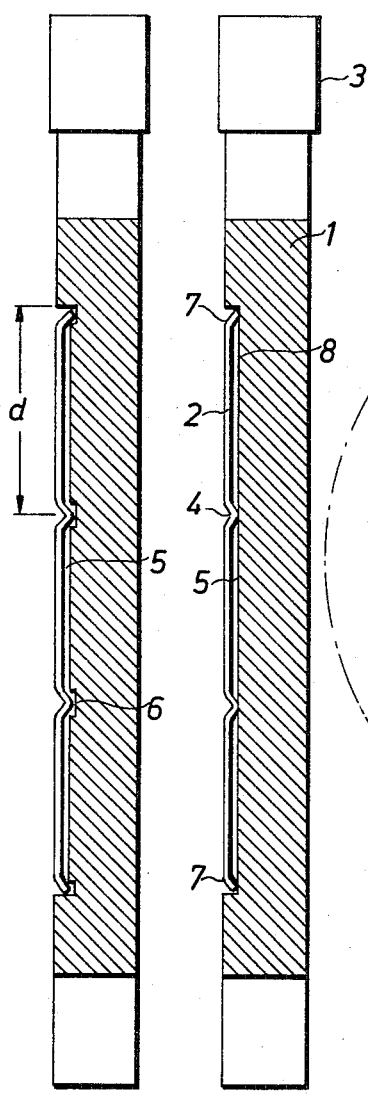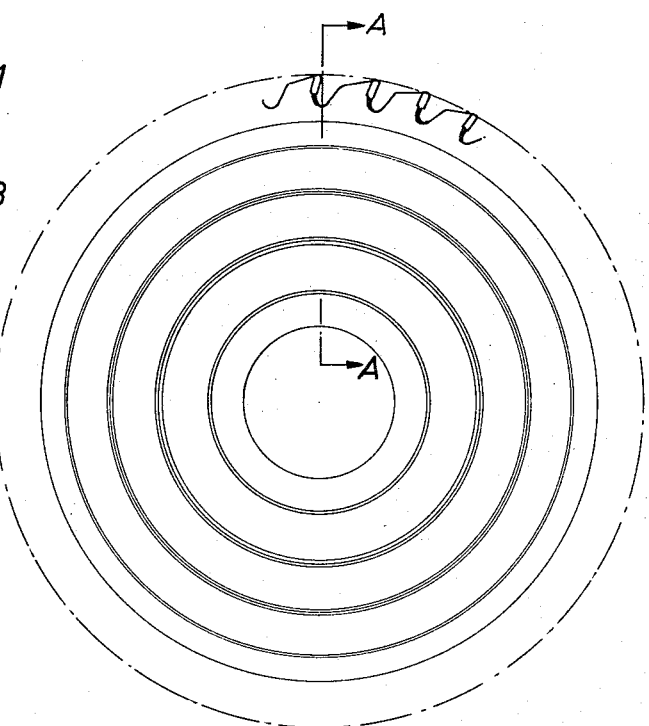
Fig.1 Fig.2 Fig.3

SAW BLADE

The present invention relates to noise-suppressing saw blades and more especially sandwiched saw blades comprising a circular base plate provided with teeth around its circumference and a covering plate assembled concentrically thereto by gluing.

It previously had been proposed to suppress vibration produced noise by using sandwiched saw blades. The structures known heretofore, however, have all included certain defects. Usually, the assembled plates of such saw blades have jointly been equipped with cutting elements. A difficulty experienced with such saw blades was that undesirable clearances successively appeared in the teeth area, which clearances caused loosening thereof after a certain length of time. In another type of sandwiched saw blade only one of the assembled plates was equipped with cutting elements: in that case a difficulty experienced with this assembly was that the exposed gluing layer was subjected to penetration from the workpiece, which penetration caused further separation of the plates. Further, noise suppressing ability of saw blades such as above referred to has not been as effective as desirable.

It has been observed that noise-suppression with saw blades comprising circular blades assembled to each other by gluing mainly is effective at the peripheral edge area thereof where a maximum of strain occurs when in use. This means that the adhesive layer most effective in noise-suppression is that portion which is subjected to straining to the highest degree.

An object of the invention is to provide a new and improved saw blade which does not include the above-mentioned disadvantages. Outgoing from the above observations the proposal is made of a sandwiched saw blade in which a plurality of circularly extending edges are provided by imparting circularly extending indentations to the covering plate thus rendering those glue layer portions adjacent thereto capable of being strained to a desirably high degree. Further, such a saw blade is made favorably resistant against static loads if the covering plate has a thickness considerably smaller than that of the base plate.

The invention will now be described more specifically in the following, taken with reference to the accompanying drawing which shows embodiments of the same:

FIG. 1 is a section along the line A—A in FIG. 3 of a preferred embodiment of the invention;

FIG. 2 is a section along the line A—A in FIG. 3 of an alternative embodiment of the inventive concept;

FIG. 3 shows the embodiments of FIGS. 1-2 as seen in side view;

Figure 4:
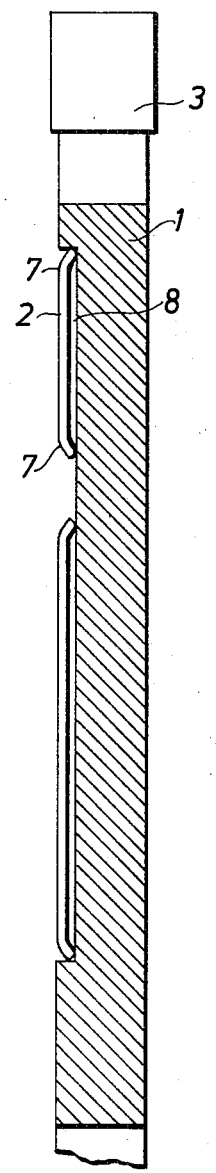
FIG. 4 shows a section along the line B—B in FIG. 5.

In the drawing a circular metal base plate is indicated at numeral 1, and at numeral 2 there is shown a circular covering plate, said plates being concentrically assembled to each other by gluing. Only the base plate 1 is provided with cutting teeth 3 around its circumference, said cutting teeth preferably being tipped with tungsten carbide or other hard material.

The radial extent of covering plate 2 is smaller than that of base plate 1 to which it is assembled, said covering plate 2 also having considerably less thickness than that of base plate 1, thus imparting to the assembled saw blade a sufficiently high stiffness against static loads. Preferably, the ratio of thickness of covering plate to base plates should be 1:10.

Covering plate 2 is provided with circularly extending indentations or recesses 4 imparted to it, which indentations all extend concentrically with respect to the center of the plate assembly. This structure renders the covering plate 2 as well as those portions of the gluing layer 5 located adjacent said indentations 4 capable of being strained to a desirable degree. Preferably, said gluing layer should be an adhesive of the epoxy type.

In the two alternative embodiments shown in FIGS. 1-3, circularly and concentrically extending indentations 4 are imparted to the covering plate 2. The indentations 4 may be partially received in recesses 6 adapted therefor in the base plate 1. Alternately, the indentations 4 of the covering plate 2 are brought into contact with the base plate 1 as shown in FIG. 2. In both the embodiments shown in FIGS. 1-3 covering plate 2 is received in a round recess 8 provided in the base plate 1 such that the exterior surface of plate 2 is flushed with that of plate 1. Edge portions 7 of the covering plate 2 are indented into contact with the bottom of recess 8, thus eliminating any risk of workpiece (board) penetration into the gluing layer between the plates.

Further, the radial dimension $d$ of those ring portions of covering plate 2 created by imparting said indentations 4 thereto is of importance. The said dimension $d$ should be equal to, or exceed, the value of a factor $\sqrt{Ebc/G}$ where E indicates module of elasticity of covering plate 2, $b$ indicates thickness of gluing layer 5, $c$ indicates thickness of covering plate 2 and G indicates module of rigidity of the gluing layer. At the same time, said radial dimension preferably should not exceed double the value of said factor, which relationship should enable obtaining an optimum of noise-suppressing ability.

Figure 5:
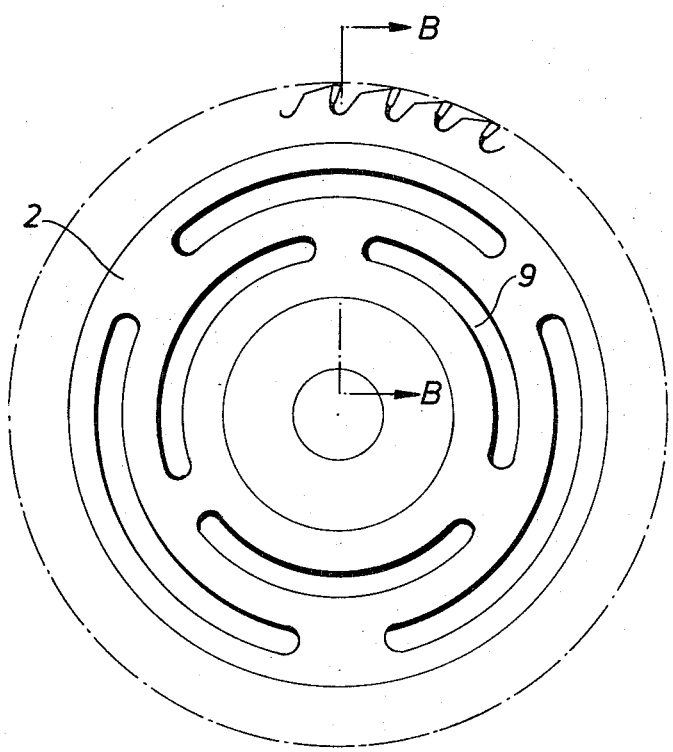
FIG. 5 shows the embodiment of FIG. 4 as seen in side view.

In an alternative embodiment shown in FIGS. 4-5, covering plate 2 is provided with a plurality of circularly and concentrically extending recesses 9, the mutual distance radially between said recesses being the same. As appears from FIG. 4, the edges 7 of said recesses 9 are indented into contact with the bottom of plate-receiving recess 8 in the base plate 1. Preferably, those recesses 9 extending in one circle are so arranged with respect to the recesses along an adjacent circle that there is overlapping therbetween in the manner shown in FIG. 5.

A saw blade assembly according to the invention enables eliminating the risk of board penetration into an exposed gluing layer by indenting the peripheral edges of the covering plate against the base plate. It has now also been possible more effectively to reduce the objectionable noise emitted by such saw blade than was possible heretofore. Noise measurements have proved, for instance, that sawing in hard boards gives rise to a noise level of 90dBA whereas the noise level when not in sawing operation only amounts to 81 dBA.

I claim:

1. In a circular metal saw blade including a base plate having cutting elements at its peripheral edge and a covering plate concentrically assembled to said base plate by gluing, the improvement according to which circularly extending indentations are imparted to the covering plate, each said indentation extending concentrically with respect to the center of said plate assembly.

2. A saw blade according to claim 1, in which the base plate is provided with annular recesses adapted for partial reception of said circularly extending indentations in said covering plate.

3. A saw blade according to claim 1, in which the covering plate is provided with circularly and concentrically extending recesses the edges of which are indented into contact with the base plate.

4. A saw blade according to claim 1, in which the base plate is provided with a circular recess adapted to receive the covering plate so that the exterior surface of the latter is arranged flush with that of the base plate.

5. A saw blade according to claim 1, in which the thickness of the covering plate is considerably smaller than that of the base plate.

6. A saw blade according to claim 5, in which the ratio between the thickness of covering plate and base plate is 1:10.

* * * * *